UNITED STATES PATENT OFFICE 2,489,353

BENZOTRIAZINES

Frank J. Wolf, Westfield, and Karl Pfister, III, Elizabeth, N. J., assignors to Merck & Co., Inc., Rahway, N. J., a corporation of New Jersey No Drawing. Application January 10, 1947, Serial No. 721,470

2 Claims. (Cl. 260—248)

This invention relates to new organic chemical compounds possessing therapeutic activity, and to methods by which they may be produced from readily available starting materials. More particularly, the invention relates to the preparation of 3-hydroxy-7-halogen-benzotriazine-1,2,4-oxides-1, and to the valuable chemical compounds so produced.

Several benzotriazines have been shown in the literature, but the 3-hydroxy-7-halogen compounds have not been previously known or prepared. Furthermore, the methods shown in the literature for preparing benzotriazines are not applicable to the preparation of the new 3-hydroxy-7-halogen compounds. These products, in addition to having antimalarial activity, are useful as dyes and pigments, and also as intermediates in the preparation of other antimalarial agents and dyes.

One method of preparing the compounds of the present invention is by diazotization of a 3-amino-7-halogen-benzotriazine-1,2,4-oxide-1, as for example the 7-chloro or 7-bromo compounds, obtained by reacting the corresponding 4-halogen-2-nitro-aniline with cyanamide and treating the resulting guanidine derivative with alkali, as fully disclosed in our pending application Serial No. 661,084, filed April 10, 1946. The diazotization is preferably effected with sodium nitrite, sulfuric acid, and phosphoric acid, although the phosphoric acid is not absolutely essential in the reaction.

The reaction is carried out below room temperature, the reactants being combined at a temperature below about 10° C.; and after standing for a short time in an ice bath at 0° C. the mixture is poured over cracked ice. Toward the end of the reaction water is added and the reaction mixture is stirred until all evolution of gases ceases. The resulting precipitate is dissolved in hot alkali and after charcoal treatment, the solution is acidified with glacial acetic acid to precipitate the 7-halogen-3-hydroxy-benzotriazine-1,2,4-oxide-1.

The reaction described above can be represented as follows:

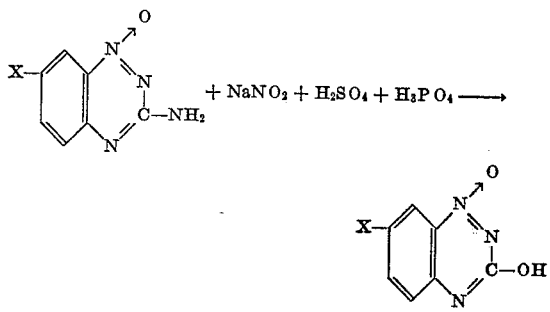

where X = halogen.

A preferred synthesis, however, involves reaction of a 4-halogen-2-nitro aniline in organic solvent solution with phosgene, added slowly at a temperature of about 60° C., to form the intermediate 4-halogen-2-nitrophenyl carbamyl chloride or 4-halogen-2-nitrophenyl-isocyanate. The reaction mixture, after standing for 10–12 hours at room temperature is concentrated in vacuo to remove about 15 to 20% of the organic solvent, and is then cooled and stirred while adding anhydrous ammonia gas, keeping the temperature below about 20° C., until no further yellow precipitate is formed. This precipitate, 4-halogen-2-nitrophenylurea, is reacted with about 30% sodium hydroxide at about 90–95° C. and then acidified with concentrated hydrochloric acid causing the formation of a yellow precipitate of 7-halogen-3-hydroxy-benzotriazine-1,2,4-oxide-1.

The foregoing reactions can be represented as follows:

$$X-C_6H_3(NO_2)(NH_2) \xrightarrow{COCl_2} [X-C_6H_3(NO_2)(NHCOCl)] \xrightarrow{NH_3}$$

$$X-C_6H_3(NO_2)(NHCONH_2)$$

$$\downarrow 30\% \text{ NaOH}$$

benzotriazine-3-OH ⇌ (HCl) benzotriazine-3-ONa where X is halogen.

The following examples show how procedures of the present invention can be carried out, but it is to be understood that these examples are given by way of illustration and not of limitation.

Example 1

A solution of 3.4 grams of sodium nitrite dissolved in 25 ml. of concentrated sulfuric acid is added to a suspension of 7 gm. of 7-chloro-3-amino benzotriazine-1,2,4-oxide-1 in 50 ml. of concentrated sulfuric acid at a temperature below 10° C. The solution is shaken and mixed well while 90 ml. of 85% phosphoric acid is slowly added. The temperature is kept below 30° C. After standing in an ice bath at 0° for ¼ hour, the solution is poured into 400 gms. of cracked ice. Near the end of the addition, 400 ml. of H₂O is added. The final temperature is about 15° C. The mixture is stirred for one-half hour until the evolution of all gases ceases. The precipitate that forms is filtered and taken up in 600 ml. of hot 1.2N alkali treated with powdered charcoal ("Norit"), and filtered. Upon acidifying the filtrate with glacial acetic acid, a precipitate of 7-chloro-3-hydroxy-benzotriazine-1,2,4-oxide-1 is formed, which is recovered by filtration.

*Example 2*

330 gms. of 4-chloro-2-nitroaniline is suspended in six liters of benzene in a twelve liter three-necked flask equipped with a "Glascol" heating mantle. Phosgene (330 g.) is added as the flask is heated to 60° C. over the period of two hours and the temperature of 60° C. is maintained until a total of 1165 gms. of phosgene has been added. The total time required is five hours. The solution is allowed to stand overnight at room temperature. Thereupon the solution is concentrated in vacuo until 1000 ml. of benzene has been removed. The flask containing the benzene solution is now stirred and cooled in an ice bath while anhydrous ammonia gas is added at such a rate that the temperature remains below 20° C., and until no more yellow precipitate is formed. The time required is three quarters of an hour. The material is then filtered, washed with 1000 ml. of petroleum ether, and dried. In order to remove any urea that might have been formed, the precipitate is washed with five liters of hot water and filtered and dried. Yield of 4-chloro-2-nitrophenylurea 330 gms., M. P. 204–5°, 80% of theoretical.

330 gms. of 4-chloro-2-nitrophenylurea as prepared above is suspended in nine liters of 30% sodium hydroxide. The mixture is heated at 90–95° with stirring of ½ hour. The mixture is acidified with concentrated hydrochloric acid and filtered, the yellow precipitate is dried. The yield is 266 gms., M. P. 225–6°, 88% of the theoretical amount. A sample recrystallized from Cellosolve has a melting point of 230–1°, and shows no depression when mixed with a sample of 7-chloro-3-hydroxy benzotriazine-1,2,4-oxide-1 obtained by the diazotization of 7-chloro-3-aminobenzotriazine-1,2,4-oxide-1.

Modifications can be made in the procedures above described without departing from the spirit and scope of the present invention and we are to be limited only by the appended claims.

We claim:

1. 7-halogen-3-hydroxy-benzotriazine-1,2,4-oxide-1.

2. 3 - hydroxy - 7 - chlorobenzotriazine - 1,2,4-oxide-1.

FRANK J. WOLF.
KARL PFISTER, III.

REFERENCES CITED

The following references are of record in the file of this patent:

FOREIGN PATENTS

| Number | Country | Date |
|---|---|---|
| 486,577 | Great Britain | 1938 |

OTHER REFERENCES

Bischler, Berichte 22 (1889), pp. 2818, 2806.
Arndt, Berichte 46 III (1913), pp. 3522–3530.
Parkes, Chem. Soc. J., 1938, pp. 1842 and 1843.